United States Patent [19]

Haas

[11] 4,129,235

[45] Dec. 12, 1978

[54] MANUALLY ACTUATED SPRAY HEAD WITH COMFORT HOLD AND ACTUATOR

[76] Inventor: Edwin J. Haas, 17004 Pearldale Ave., Cleveland, Ohio 44135

[21] Appl. No.: 800,931

[22] Filed: May 26, 1977

[51] Int. Cl.[2] .......................... B05B 11/00; G01F 11/12

[52] U.S. Cl. .......................... 222/321; 222/385; 222/402.13

[58] Field of Search .......................... 251/321, 322, 323; 222/402.13, 182, 383, 385, 320, 321

[56] References Cited

U.S. PATENT DOCUMENTS

| | | | |
|---|---|---|---|
| 3,091,367 | 5/1963 | Fredrickson | 222/402.13 X |
| 3,628,702 | 12/1971 | Kimura | 222/402.13 |
| 3,907,175 | 9/1975 | Haas | 222/402.13 |

*Primary Examiner*—David A. Scherbel

*Attorney, Agent, or Firm*—Baldwin, Egan, Walling & Fetzer

[57] ABSTRACT

A manually actuated spray dispenser is presented having the usual reservoir for a liquid to be dispensed, with a manually operated pump at the upper end of the container for moving the liquid in the reservoir out through a dispenser opening at the top of the container and including a comfort hold extending from the upper end of the liquid reservoir to the top of the manual pump equipment, completely enclosing the spray complex. The comfort hold is provided at its upper end with a circular button having a downward projection engaging the usual actuator for the spray pump. The comfort hold is of a diameter to be comfortably held in the hand of a user of the spray equipment so that the user may grasp the container by gripping the hold and he will then have his fingers in position to actuate the button up and down to dispense the liquid contents of the reservoir.

6 Claims, 6 Drawing Figures

MANUALLY ACTUATED SPRAY HEAD WITH COMFORT HOLD AND ACTUATOR

BACKGROUND OF THE INVENTION

Manually actuated spray equipment for dispensing liquids are presently on the market but they are so constructed that the container holding the liquid to be dispensed has a portion to be grasped by the user which is so far removed from the top of the spray complex that it is impossible or at least uncomfortable to engage the manually operated spray equipment while holding the liquid container or reservoir at the place indicated by its shape for occupation by the hand of the user. It is an object of the present invention to provide additional structure whereby the zone above the top of the liquid container is embraced in a comfort hold which places the hand of the user in an easy position to operate the spray pump by one of his fingers.

An object of the present invention, therefore, is to equip present spray equipment with a generally cylindrical comfort hold snapped to the upper edge of the existing container and extending upwardly and then inwardly at the top of the spray equipment and there providing an operating button with a central projection adapted to engage the usual actuator for the manually operated spray dispenser so that the user may grasp the equipment by holding the comfort hold which places his fingers in position to easily operate the button up and down so as to spray the contents of the container.

Other objects and advantages of the invention will be apparent from the accompanying drawings and description and the essential features thereof will be set forth in the appended claims.

Figure 2:
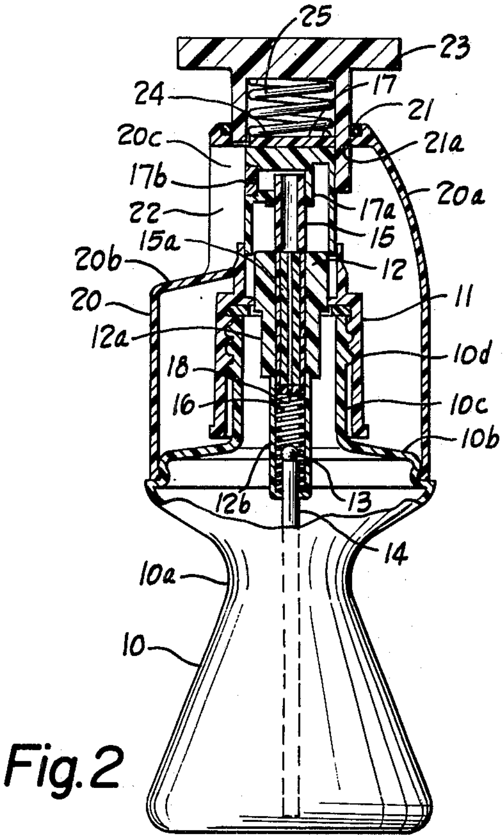
FIG. 2 is a view taken along the line 2—2 of FIG. 1 with the upper portion thereof being in section to show the operation of the manually actuated spray device. The operating button of the present invention is omitted from FIG. 2.
Figure 4:
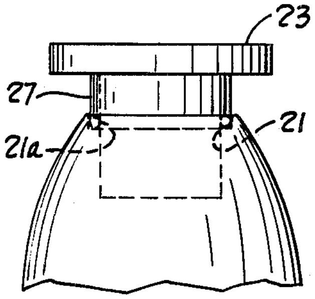
FIG. 4 is an elevational view taken in the same position as the same equipment of FIG. 1 but showing a spacer utilized to prevent unintended spraying of the contents.
Figure 5:
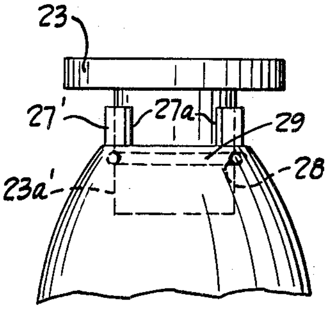
Figure 6:
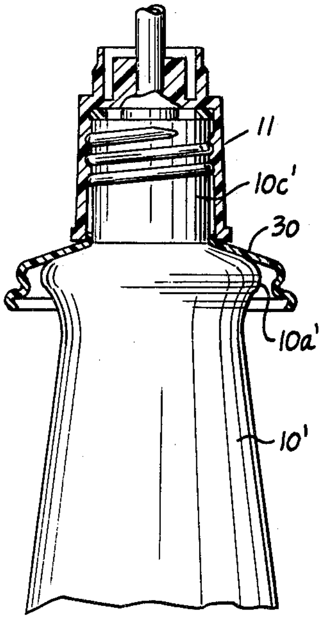

FIG. 5 is a view similar to FIG. 4 but showing, in addition to the spacer ring, an O-ring around the central projection of the operating button so as to prevent its removal from the comfort hold; while FIG. 6 is a central sectional view showing a different shape spray container to which has been added an adapter to hold applicant's comfort hold structure, which is shown being held in place by a screw cap which is a portion of the structure shown in detail in FIG. 2.

The basic structure of the manually actuated spray dispenser shown in FIG. 2 of this patent application is found in existing anti-perspirant spray for the trademark product BAN made and sold by Bristol-Myers Company of New York. This structure will next be described. A container or reservoir 10 for the liquid product to be dispensed converges from the bottom upwardly to a portion 10*a* adapted to be grasped by a hand of the user and which is about 3/5 of the way up from the bottom of the reservoir. The top 10*b* of the reservoir has an upwardly extending neck 10*c* to which is attached by coarse threads 10*d* a cap 11 which carries most of the operating parts. Centrally of the cap 11 is a cylinder 12 of the manually actuated spray pump. This extends on a larger diameter down to the point 12*a* below which a cylinder portion 12*b* extends on down to the level 13 where it is firmly attached to a communicating tube 14 which extends to the bottom of the reservoir. At the level 13, there is a small check valve which closes on a down stroke and opens only on an up stroke. The hollow piston 15 of the spray pump slidably fits in the upper part of the cylinder body 12 and has a downwardly extending portion 15*a* at its lower end which is of a size to enter the lower portion of the cylinder portion 12*b*. A compression spring 16 is held between the levels 12*a* and 13 in position to be compressed by a downward stroke of the piston 15. An actuator 17, generally cylindrical in shape, slidably fits in the upper portion of the cap 11. This actuator has an internal cup 17*a* which embraces the upper end of the piston 15. The actuator also has a spray discharge opening 17*b* on one side only. The upper end of the piston 15 is circular and it fits against a square recess in the actuator 17 so that anything forced upwardly by the pump 12, 15 escapes out the spray opening 17*b*. It will be understood that there is a very fine opening 18 through the bottom of the piston portion 15*a* so that on an upper stroke of the actuator 17 and of the piston 15, liquid will be sucked through the tube 14 and the check valve 13 into the piston 15. Then, when the downward stroke of actuator 17 and of piston 15 occurs, the liquid trapped by the previous upward stroke is caught by the closed check valve 13 and forced out the upper end of the piston 15 and so through the spray opening 17*b*.

Figure 1:
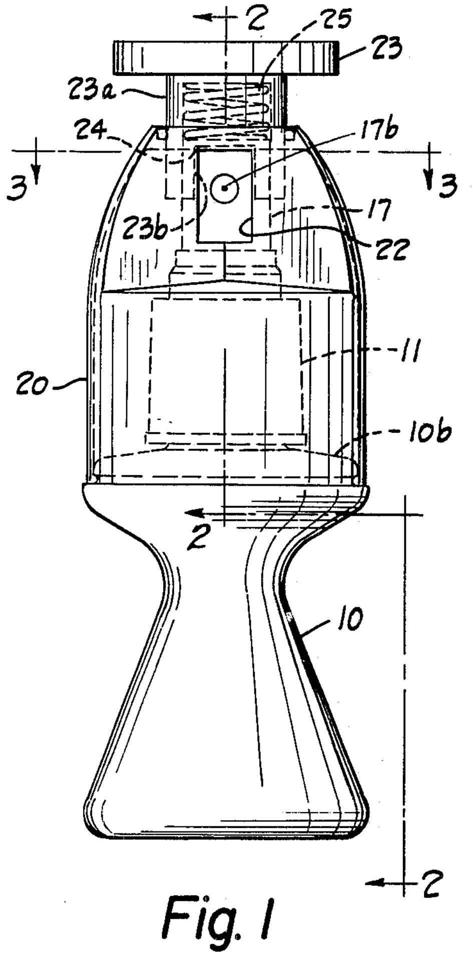
FIG. 1 is a side elevational view of known spray equipment to which has been added this invention.

The present invention consists of a comfort hold 20 which is generally cylindrical in shape for a large portion of its length and of a diameter to fit closely over the top 10*b* of the reservoir 10 and to snap into the position shown in FIG. 2. The member 20 curves upwardly and inwardly at 20*a* toward an opening 21 at its upper end. The curving structure 20*a* extends around a circumferential dimension of over half, but not quite 3/5, of the circumference of the member 20. On the side opposite the spray opening 17*b*, at the left-hand side of FIG. 2, the member 20 has a shelf portion 20*b* extending inwardly and slightly upwardly to a generally flat portion 20*c*. At its midpoint, the portion 20*c* has a vertically elongated opening or recess 22 opposite the spray opening 17*b* as clearly seen in FIG. 1. The present invention adds a button 23 which is circular in top plan view and which has an integral downwardly extending projection 23*a* which in the embodiment shown in FIGS. 1 and 2, is a cylindrical wall extending downwardly from the button 23 and having a downwardly opening recess 23*b* which is opposite the spray opening 17*b* and permits the spray to at all times discharge outwardly.

Inside the projections 23*a*, there is a contactor 24 which fits fairly snugly inside the hollow portion of the member 23*a* and which is suspended by a spring 25 from the underside of the button 23.

In operating the structure thus far described, the user grasps the comfort hold 20 in his hand and this places his fingers much higher than the reservoir portion 10*a*, and in a position where the user's fingers very easily can reach the top of the button 23 to work it up and down so as to operate the spray pump dispenser. It should be understood that the member 20 is of a diameter to be easily grasped by the hand of the user.

Figure 3:
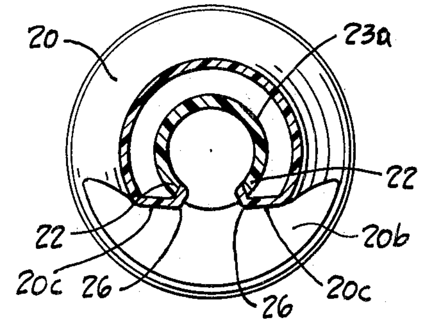
FIG. 3 is a sectional view taken along the line 3—3 of FIG. 1.

In one form of the invention, means is provided, as shown in FIG. 3, to prevent the projection 23a being turned out of registration between the spray opening 17b and the recess 22. This comprises vertically extending hook-shaped portions 26 integral with the member 20 and spaced apart so as to snugly receive the opposite parallel sides of the recess 22 which of course is part of the projection 23a. Thus, the structure shown in FIG. 3 serves to hold the button 23 and its projection 23a in an oriented position as the button is pushed up and down by the fingers of a user.

Another valuable addition to the invention is a partly circular spacer ring 27 shown in FIGS. 4 and 5. In the form of the invention described in connection with FIGS. 1 and 2, this can be a completely circular collar having a dimension to just fit loosely between the button 23 and the top opening of the member 20 at the opening 21 as shown in FIG. 4. To hold the spacer properly in place, there should be provided, as shown in FIG. 2, a slightly indented shelf at 21a into which the spacer 27 fits snugly. Thus, with the spacer ring 27 in the position shown in FIG. 4, one can press upon the button 23 without causing any dispensing of spray through the spray opening 17b.

A further improvement is shown in FIG. 5 wherein an annular outwardly opening recess 28 is provided in the member 23a' and an O-ring 29 is placed in this recess so that when the parts are assembled as shown in FIG. 5, the button 23 cannot be raised off its position on the entire structure. In this case, the spacer ring 27' extends a little more than half way around the projection 23a' so the open ends 27a can be snapped over the portion 23a' so that the spacer member remains firmly in position. To operate this device of FIG. 5, one has to first remove the spacer ring 27' after which the button 23 may be operated to generate the desired spray action.

In FIG. 6, there is shown another modification of this invention wherein a reservoir 10' of a different shape than that shown at 10 is provided with the present invention. It will be noted that the reservoir of the container 10' has a diameter at 10a' which is smaller than that of the top 10b of the first described reservoir. In order to utilize the present invention with such container, one provides an adapter 30 which is circular in plan view and has an outside diameter the same as that of the top 10b shown in FIGS. 1 and 2. To use this adapter 30, one has only to remove the cap 11 of a structure just like that shown in FIG. 2, then place the adapter 30 over the neck 10c' of the reservoir 10', and then screw the cap 11 down until it engages firmly on the inner circumference of the adapter 30 as shown in FIG. 6. It should be understood that the cap 11 supports all of the spray parts as described in connection with FIG. 2 and also is able to receive the comfort hold 20 which will snap over the adapter 30 in the same manner as the member 20 snaps on the top 10b of the structure shown in FIG. 2.

What is claimed is:

1. A manually actuated spray container consisting of an imperforate liquid reservoir of a size to be held in the hand of a user, said reservoir having one opening at the top including a neck, a closure for said opening including a closure cap having a threaded connection with said neck, a manually operated pump mounted in said cap including a generally cylindrical hollow pump body fixed in said cap, a liquid inlet tube fixed concentrically to the lower end of said pump body, a check valve in said body at the junction of said inlet tube and said pump body, said pump including a hollow plunger snugly fitting slidably in said pump body at its upper end, said plunger having a lower end of said plunger being of a diameter to extend into said lower end of said pump body, there being a fine opening through the lower end of said pump body communicating with said hollow of said plunger, a compression spring in said lower end of said pump body and engaged between said check valve and the lower end of said plunger, an actuator mounted for vertical reciprocation in the upper end of said closure, said actuator having a downwardly opening central recess adapted to snugly receive the upper end of said plunger, the meeting portions of said plunger and said recess being nonconforming whereby liquid in said pump body may escape there, there being a spray nozzle in said actuator communicating between said recess and atmosphere, said check valve being open only on an upward stroke of said plunger and being closed only on a downward stroke of said plunger, said reservoir having a top extending diametrically outside of said closure, a comfort hold having generally the diameter of said reservoir top and extending therefrom upwardly to a level just above said actuator, said hold coverging smoothly from said reservoir top up to the upper level of said top and there terminating in a circle opening of predetermined diameter, the bottom of said hold snapping into a fixed position on said reservoir top, a circular button having a diameter greater than said predetermined diameter, said button having a downwardly extending hollow projection of a size to pass through said circular opening and to fit snugly over said actuator, said projection having a vertically elongated through opening having parallel vertical edges on one side only opposite said spray nozzle, interfitting vertically extending hook-shaped projections on said hold on opposite sides of said through opening to receive said parallel vertical edges to position said button only with said last named through opening opposite said spray nozzle, a portion within said downwardly extending projection being positioned to press against the top of said actuator in an idle position, and said hold being of a diameter to be held comfortably in the hand of a user, whereby a user may grasp said hold and use his fingers to work said button and actuator and plunger up and down to dispense liquid from said reservoir.

2. A manually actuated spray container consisting of an imperforate liquid reservoir of a size to be held in the hand of a user, said reservoir having a neck and a dispenser opening at the top, a closure for said opening including a manually operated pump for moving liquid in said reservoir out through said dispenser opening, an actuator at the top of said closure operatively associated with said pump when moved up and down, said reservoir having a top of greater diameter than said closure, a comfort hold enclosing said top and said closure and said actuator, said comfort hold being generally cylindrical and hollow and having a bottom edge of a diameter to snap on said reservoir top diameter, said hold being of a diameter to be comfortably held in the hand of a user, said hold having a top opening, a circular button having a diameter greater than said opening, said button having a central downwardly extending projection adapted to pass through said top opening, said projection having a portion positioned to engage said actuator and having another portion adapted to encase the top of said actuator, said dispenser opening extending laterally outwardly, there being an opening on one side only of said projection portion encasing said actuator, and means for maintaining said hold in position relative to said actuator with said dispenser opening opposite said opening in said projection portion encasing said actuator, whereby a user may grasp said hold and use a finger on said button to dispense the liquid content of said reservoir.

3. A manually actuated spray container as defined in claim 2, wherein said opening on one side of said projection portion has parallel vertical sides, and said means for holding said hold in position relative to said actuator comprises hook portions on said comfort hold in position to engage said parallel sides.

4. A manually actuated spray container as defined in claim 2, wherein a spacer ring is provided of a height to fit between said button and said top opening of said comfort hold.

5. A manually actuated spray container as defined in claim 2, wherein an O-ring fits tightly on said downwardly extending projection at a level just below said top opening of said comfort hold, said O-ring having a diameter greater than said top opening, whereby said button can not be removed from said reservoir.

6. A manually actuated spray container consisting of an imperforate liquid reservoir of a size to be held in the hand of a user, said reservoir having a neck and a dispenser opening at the top, said reservoir having a top of greater diameter than said dispenser opening, a closure for said opening including a manually operated pump for moving liquid in said reservoir out through said dispenser opening, an actuator at the top of said closure operatively associated with said pump when moved up and down, a ring shaped adapter having a central opening larger than said reservoir neck and an outer diameter larger than the diameter of the top of the reservoir, a comfort hold enclosing said reservoir top and said closure and said actuator, said comfort hold being generally cylindrical and hollow and having a bottom edge of a diameter and shape to snap on said adapter embracing said reservoir top, said hold being of a diameter to be comfortably held in the hand of a user, said hold having a top opening, a circular button having a diameter greater than said opening, said button having a central downwardly extending projection adapted to pass through said top opening, said projection having a portion positioned to engage said actuator and having another portion adapted to encase the top of said actuator, said dispenser opening extending laterally outwardly, there being an opening on one side only of said projection portion encasing said actuator, and means for maintaining said hold in position relative to said actuator with said dispenser opening opposite said opening in said projection portion encasing said actuator, whereby a user may grasp said hold and use a finger on said button to dispense the liquid content of said reservoir, and whereby said adapter can be placed over said reservoir top after which said closure and said manually operated pump may be attached over said adapter.

* * * * *